US006350498B1

(12) United States Patent
Hess et al.

(10) Patent No.: US 6,350,498 B1

(45) Date of Patent: Feb. 26, 2002

(54) SIMULATED FIREPLACE MADE FROM A COMPRESSIBLE MATERIAL

(75) Inventors: Kristoffer Hess; Martyn R. Champ, both of Cambridge (CA)

(73) Assignee: Dimplex North America Limited, Cambridge (CA)

( * ) Notice: Subject to any disclaimer, the term of this patent is extended or adjusted under 35 U.S.C. 154(b) by 0 days.

(21) Appl. No.: 09/535,013

(22) Filed: Mar. 24, 2000

(51) Int. Cl.$^{7}$ .................................................. A01N 1/00

(52) U.S. Cl. .................. 428/15; 428/542.2; 427/407.1; 52/314; 52/315; 40/428

(58) Field of Search ...................... 428/15, 35.7, 542.2; 52/316, 315, 211, 309.1, 314, DIG. 7; 427/307, 407.1; 40/428

(56) References Cited

U.S. PATENT DOCUMENTS

| | | | | | |
|---|---|---|---|---|---|
| 14,472 | A | | 3/1856 | Schwickardt | |
| 50,508 | A | | 10/1865 | May | |
| 55,604 | A | | 6/1866 | Beckers | |
| 107,428 | A | | 9/1870 | Wheeler | |
| 118,464 | A | | 8/1871 | Ley | |
| 133,697 | A | | 12/1872 | Chinnock | |
| 161,290 | A | | 3/1875 | Sochefsky | |
| 198,381 | A | | 12/1877 | Hagemann | |
| 201,252 | A | | 3/1878 | King | |
| 230,407 | A | | 7/1880 | Devereux | |
| 234,610 | A | | 11/1880 | Pruyn et al. | |
| RE9,553 | E | | 2/1881 | Devereux | |
| 291,436 | A | | 1/1884 | Wagner | |
| 3,636,998 | A | | 1/1972 | Sarrail | |
| 3,672,926 | A | | 6/1972 | Ramey | |
| 3,874,140 | A | * | 4/1975 | Seehusen | 52/315 |
| 5,787,667 | A | * | 8/1998 | Sheahan et al. | 52/315 |
| 6,132,820 | A | * | 10/2000 | Callahan | 428/15 |

* cited by examiner

*Primary Examiner*—Deborah Jones
*Assistant Examiner*—Abraham Bahta

(57) ABSTRACT

The present invention is directed to a simulated fireplace formed, at least partially, from a compressible material, and to a method of forming a simulated fireplace from a compressible material that has a surface that simulates surfaces found in real fireplaces. In particular, this invention forms a simulated fireplace using a compressible material, such as wood, wood composites, or plastics. A pattern is pressed into a surface of the compressible material forming a sculptured surface. The surface is also coated. In one embodiment of the invention the surface is coated with a solvent based coating, for example, a sealer, a primer, and a finish that can include color and/or gloss. In another embodiment of the invention the surface is coated with a powder coating, such as a low temperature epoxy. In yet a further alternative the surface is coated with a polymer film. By pressing a pattern into the material surface and coating the surface with an appropriate coating, a variety of surfaces found in real fireplaces can be simulated, for example, cast-metal or masonry surfaces.

7 Claims, 3 Drawing Sheets

SIMULATED FIREPLACE MADE FROM A COMPRESSIBLE MATERIAL

FIELD OF THE INVENTION

This invention relates to a simulated fireplace formed, at least partially, from a compressible material, and a method of forming a simulated fireplace using a compressible material. This invention also relates to a compressible material having a surface that simulates a surface of a fireplace, and to a method of forming the simulated surface on the compressible material,

BACKGROUND OF THE INVENTION

Simulated fireplaces are popular since they provide visual qualities of real fireplaces without the associated costs and complications, such as, for example, venting of combustive gases. One type of simulated fireplace is the electric fireplace that produces a realistic flame using various flame effect elements, screens, and light sources. A simulated fuel bed (for example, a burning log) can also be provided. Electric fireplaces do not produce heat from the simulated flame. As a result, the fireplace, comprising the housing, hearth, surrounding mantel, decorative trim or faceplate, and any supporting base, can be constructed from a variety of materials, including non-metallic materials such as wood, wood composites, and plastics. To provide an authentic look to the fireplace the surfaces of these materials can be treated to simulate surfaces found on real fireplaces. Any patterns on the material for the simulated surfaces are typically made by routing, carving, or milling. It can be appreciated, however, that this can be labour intensive and flame consuming.

There is a need for a cost effective method of forming simulated fireplaces from materials such as wood, wood composites, and plastics, and to forming a surface on the material that simulates surfaces found in real fireplaces.

SUMMARY OF THE INVENTION

The present invention is directed to a method of forming a simulated fireplace, at least partially, from a material that has a surface that simulates surfaces found in real fireplaces. It is to be understood that the term fireplace as used in this application includes a body comprised of, without limitation, alone or in various combinations, a housing, hearth, surrounding mantel, decorative trim or faceplate, and any supporting base of the fireplace, as well as other similar structures, such as, for example, a cast-iron stove.

In particular, this invention forms a simulated fireplace using a compressible material. Examples of a compressible material suitable for this invention include non-metallic materials, for example, soft woods, such as pine, poplar, or birch, wood composites, such as medium density fibreboard or plywood, and plastic composites, such as foams, ABS, polypropylene, or PVC.

A pattern is pressed into a surface of the compressible material forming a sculptured surface. Further, at least a portion of the surface of the material is coated. In one embodiment of the invention the surface is coated with a solvent based coating, comprising, alone or in combination, a sealer, a primer, and a finish that can include colour and/or gloss. In another embodiment of the invention the surface is coated with a powder coating, such as a low temperature epoxy. In yet a further embodiment of the invention the surface is coated with a polymer film, such as a vinyl film.

By pressing a pattern into the surface of the material and coating the surface with an appropriate coating, a variety of surfaces found in real fireplaces can be simulated, for example, cast metal and masonry surfaces.

Once the compressible material has been pressed and coated to form the various simulated surfaces desired, the compressible material can then be assembled to form the simulated fireplace.

This invention is also directed to a compressible material having a surface that simulates a surface of a real fireplace and to a method of making the same. The method comprises pressing a pattern into the surface of the compressible material and coating the surface with an appropriate coating. In this manner a variety of surfaces found in real fireplaces can be simulated, for example, cast metal or masonry surfaces.

BRIEF DESCRIPTION OF THE DRAWING FIGURES

For a better understanding of the present invention and to show more clearly how it would be carried into effect, reference will now be made, by way of example, to the accompanying drawings that show preferred embodiments of the present invention, and in which.

DESCRIPTION OF THE PREFERRED EMBODIMENT

Figure 1:
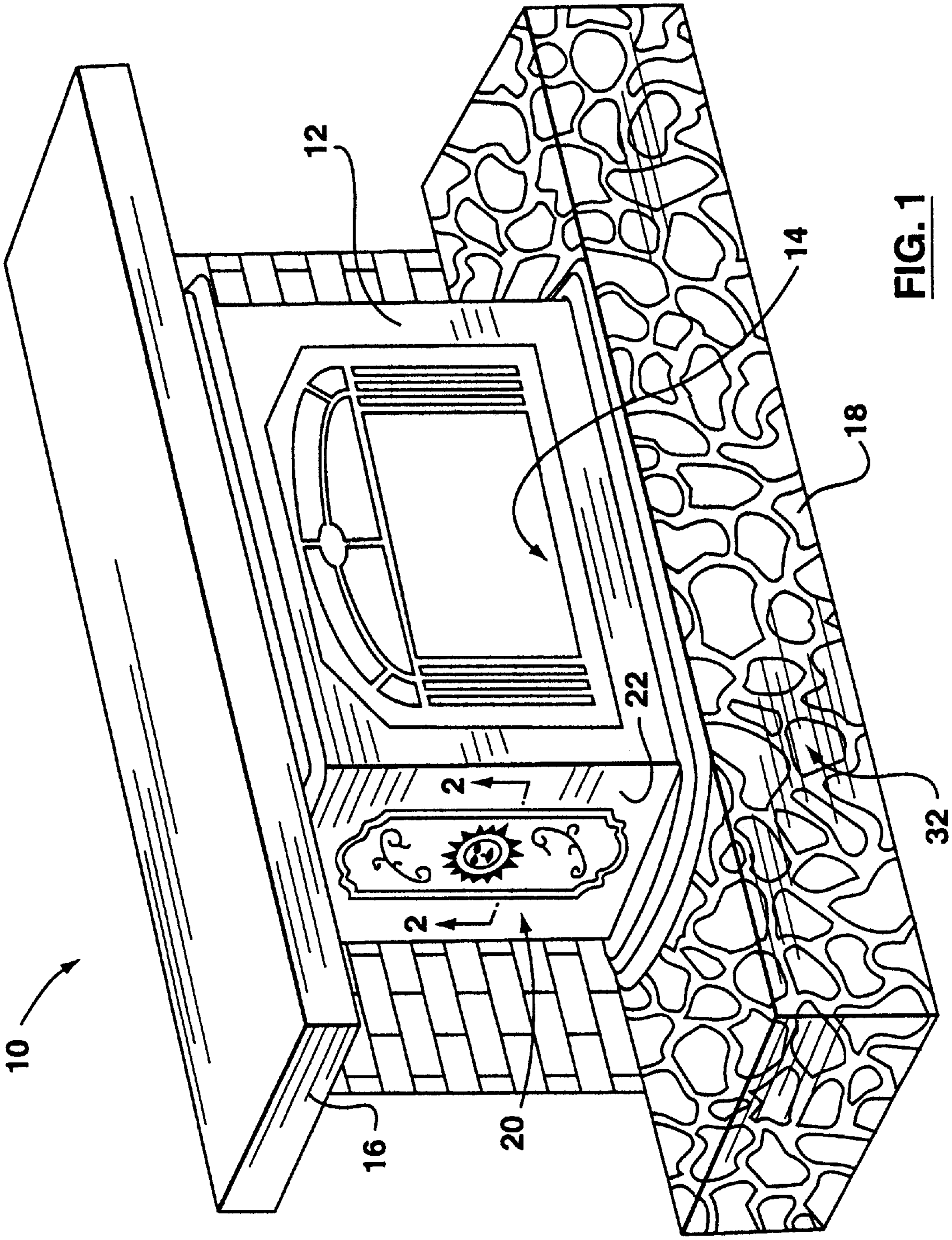
FIG. 1 is a perspective view of a simulated fireplace of this invention.

A simulated fireplace 10 is illustrated in FIG. 1. For purposes of his invention the term fireplace is construed to include a body comprised of, without limitation, alone or in various combinations, the housing 12, hearth 14, surrounding mantel 16, a supporting base 18, decorative trim or faceplate (not illustrated), as well as other similar structures, such as, for example, a cast-iron stove. Fireplace 10 can be, for example, an electric fireplace that produces a realistic flame using various flame effect elements, screens, and light sources (not illustrated). A simulated fuel bed, for example, a burning log (not illustrated), can also be provided. Simulated fireplaces of this invention, such as electric fireplaces, do not produce heat from the simulated flame. As a result, the fireplace can be constructed from a variety of materials, including, for example, non-metallic materials such as wood, wood composites, and plastics. To provide an authentic look to the fireplace the surface of these materials can be treated to simulate surfaces found on real fireplaces, as will hereinafter be explained.

Figure 6:
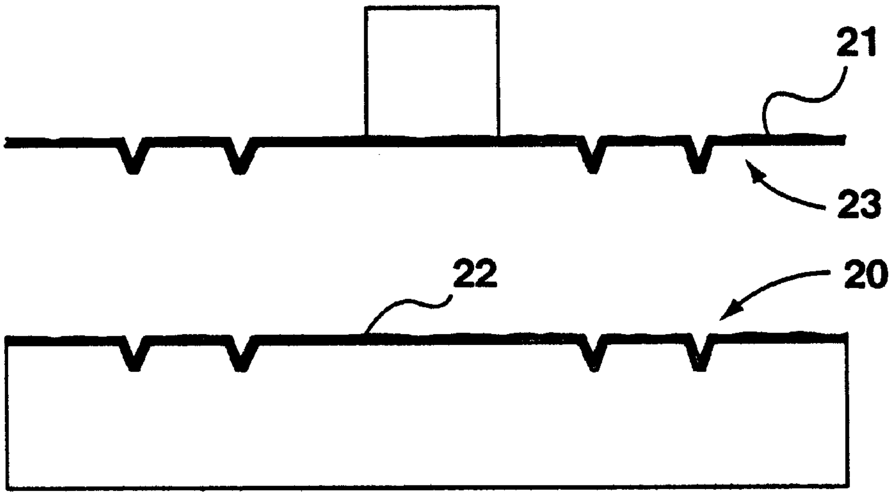
FIG. 6 is view showing the pressing of the pattern in the compressible material.

The material used in simulated fireplace 10 is a compressible material. Examples of a compressible material suitable for this invention are soft woods, such as pine, poplar, or birch, wood composites, such as medium density fibreboard or plywood, and plastic composites, such as foams, ABS, polypropylene, or PVC. Use of a compressible material allows a pattern (as at 20) to be pressed into a surface 22 of the material forming a sculptured surface or relief. As illustrated in FIG. 6 the pattern can be pressed into surface 22 using a stamp 21 having the negative form (as at 23) of the desired pattern (in this case pattern 20 from FIG. 1). Stamp 21 is heated and applied to surface 22 with pressure using, for example, a mechanical, hydraulic, or pneumatic press (not illustrated).

The pattern illustrated in FIG. 1 can be created by pressing a series of grooves (shown as 24, 26, 28, and 30, in FIG. 2) into surface 22. It can be appreciated, however, that a variety of patterns can be pressed into the material surface. For example, the pattern shown at 20 is used to provide a cast-metal appearance to housing 12 of fireplace 10. The pattern shown at 32, however, is used to provide an appearance of masonry for base 18 of fireplace 10. Other patterns will be apparent to those skilled in the art.

Figure 2:
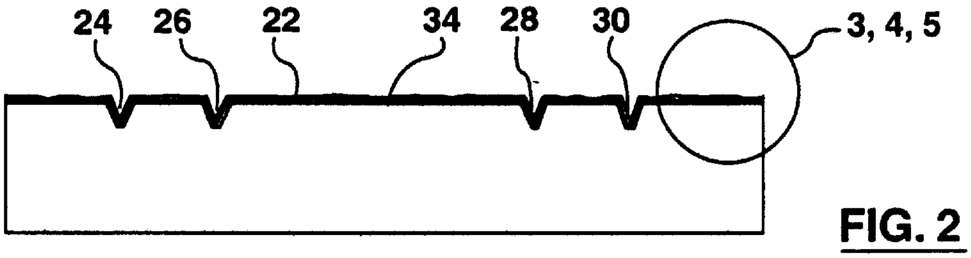
FIG. 2 is a cross section taken along the lines 2—2 of FIG. 1.
Figure 3:
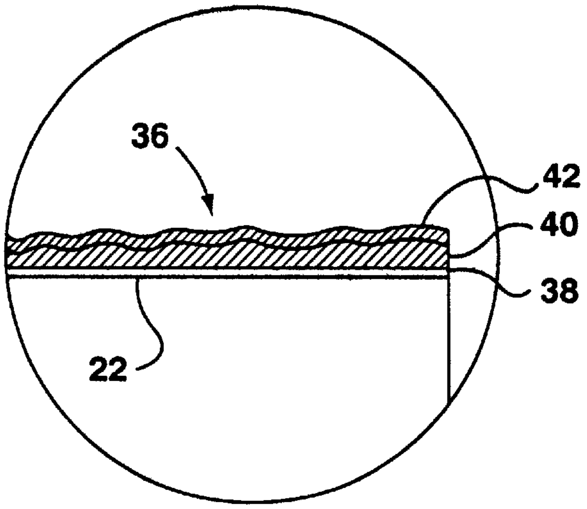
FIG. 3 is an enlargement of the circled area of FIG. 2.

Further, at least a portion of the surface of the compressible material is coated (see 34 of FIG. 2). It is preferred that the surface be coated after the pattern is pressed therein to create the simulated surface of a fireplace. In one embodiment of the invention the surface is coated with a solvent based coating 36, as illustrated in FIG. 3. Coating 36 in the embodiment of FIG. 3 is in three layers. The first layer 38 is a sealer, such as a lacquer, that is applied to surface 22 of the compressible material. The second layer 40 is a primer or texture coat, such as a baked enamel. The third layer 42 is a finish that can include colour and/or gloss, such as a baked enamel. By pressing a pattern into the material surface and coating the surface with an appropriate coating as described, a variety of surfaces found in real fireplaces can be simulated. For example, a cast-metal surface simulating an "orange peel" textured surface of cast iron for housing 12, or a masonry surface for base 18 of fireplace 10, as illustrated in FIG. 1.

It can be appreciated, however, that the three layers of a sealer, a primer, and a finish, as described, can be provided alone (for example, a sand texture coating) or in various combinations to create a variety of simulated surfaces, as desired.

Figure 4:
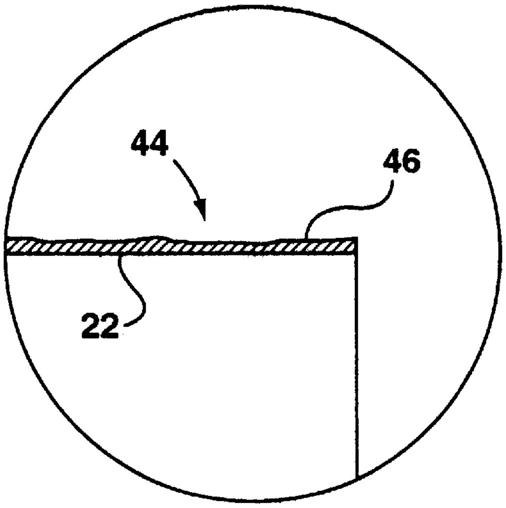
FIG. 4 is an enlargement of the circled area of FIG. 2 showing an alternative embodiment of the invention.

A second embodiment of the invention is illustrated in FIG. 4. In this embodiment the surface is coated with a powder coating 44. One example of a powder coating suitable for this invention is a low temperature epoxy 46 applied to surface 22 of the compressible material. The compressible material is heated and the low temperature epoxy is applied to surface 22 of the material while the material is hot. This allows the low temperature epoxy to be coated on surface 22 of the compressible material. Once coated, the compressible material is placed in an oven and baked. While the compressible material is baking the low temperature epoxy flows generally evenly over surface 22. Low temperature epoxies enable the baking of the material to occur at temperatures that will not burn the material. More heat resilient materials can be coated with a "higher" temperature epoxy. Again, by pressing a pattern into the material surface and coating the surface with a coating as described, a variety of surfaces found in real fireplaces can be simulated.

Figure 5:
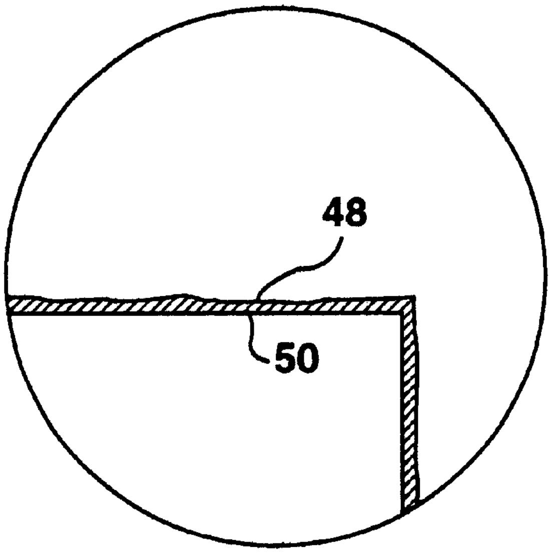
FIG. 5 is an enlargement of the circled area of FIG. 2 showing a further alternative embodiment of the invention.

In yet a further embodiment of the invention the surface is coated with a polymer film 48, as illustrated in FIG. 5. One example of a polymer film suitable for this invention is a vinyl film. The film is applied to the material using known thermo forming or vacuum forming techniques, or combinations of these. For example, a vinyl film can be wrapped around the material (generally the top and side surfaces, as illustrated in FIG. 5) with a suitable adhesive 50 applied between the vinyl film and the material. The material with vinyl film is placed on a vacuum table (not illustrated) with the top surface facing away from the table. Suction is applied forcing the air through the table thereby drawing the vinyl film to the material surface in a form-fitting manner.

Once the compressible material has been pressed and coated to form the various simulated surfaces desired, the fireplace can be assembled. For example, panels of compressible material that have a surface simulating cast metal can be used to form housing 12 of fireplace 10. The base 18 of fireplace 10 can be assembled from compressible material having a surface that simulates masonry. Other patterns and configurations would be apparent to those skilled in the art. It can be appreciated, however, that a variety of styles of simulated fireplaces can be formed using the method of this invention.

It can be appreciated that variations to this invention would be readily apparent to those skilled in the art, and this invention is intended to include those alternatives.

We claim:

1. A simulated fireplace having a body formed at least partially from a compressible material selected from the group consisting of wood, wood composites, and plastic composites, the compressible material having a pattern pressed into a surface thereof to form a sculptured surface, and a coating on at least a portion of the sculptured surface to provide a cast-metal appearance to the body.

2. The simulated fireplace as recited in claim 1 wherein the coating is a solvent-based coating and includes a sealer, a primer, and a finish.

3. The simulated fireplace as recited in claim 1 wherein the coating is a low-temperature epoxy powder coating.

4. A simulated fireplace having a body formed at least partially from a compressible material selected from the group consisting of wood, wood composites, and plastic composites, the compressible material having a pattern pressed into a surface thereof to form a sculptured surface, and a coating on at least a portion of the sculptured surface to provide an appearance of masonry to the body.

5. The simulated fireplace as recited in claim 4 wherein the coating is a solvent-based coating and includes a sealer, a primer, and a finish.

6. The simulated fireplace as recited in claim 4 wherein the coating is a low-temperature epoxy powder coating.

7. The simulated fireplace as recited in claim 4 wherein the coating comprises a vinyl film.

* * * * *

UNITED STATES PATENT AND TRADEMARK OFFICE

CERTIFICATE OF CORRECTION

PATENT NO. : 6,350,498 B1 
DATED : February 26, 2002
INVENTOR(S) : Kristoffer Hess and Martyn R. Champ It is certified that error appears in the above-identified patent and that said Letters Patent is hereby corrected as shown below:

<u>Column 4,</u>
Line 42, add a new claim,
-- 4. The simulated fireplace as recited in claim 1 wherein the coating comprises a vinyl film. --
Line 42, renumber claim 4 as claim 5.
Line 49, renumber claim 5 as claim 6.
Line 49, replace "4" with -- 5 --.
Line 52, renumber claim 6 as claim 7.
Line 52, replace "4" with -- 5 --.
Line 54, renumber claim 7 as claim 8.
Line 54, replace "4" with -- 5 --.

Signed and Sealed this

Twenty-third Day of July, 2002

*Attest:*

JAMES E. ROGAN

*Attesting Officer* *Director of the United States Patent and Trademark Office*